United States Patent [19]

Koltookian

[11] Patent Number: 4,688,962

[45] Date of Patent: Aug. 25, 1987

[54] NO-SLIP SHEAR CONNECTION

[75] Inventor: Sarkis A. Koltookian, Waterloo, Iowa

[73] Assignee: Deere & Company, Moline, Ill.

[21] Appl. No.: 843,547

[22] Filed: Mar. 25, 1986

[51] Int. Cl.⁴ .................... F16B 29/00; F16B 1/00; F16D 1/00; F16H 1/38
[52] U.S. Cl. ................. 403/408.1; 277/236; 285/917; 74/710; 74/713
[58] Field of Search ............. 74/710, 713; 29/526 R, 29/432; 403/408.1, 409.1; 277/101, 166, 200, 207 R, 213, 236; 285/328, 917; 411/160, 161, 162, 187, 188, 189

[56] References Cited

U.S. PATENT DOCUMENTS

| | | | |
|---|---|---|---|
| 2,818,129 | 12/1957 | De Vere Harnett | 74/713 |
| 3,301,578 | 1/1967 | Platt et al. | 277/213 |
| 3,314,684 | 4/1967 | Millhiser | 277/236 |
| 3,317,224 | 5/1967 | Kuskevics et al. | 277/236 |
| 3,692,341 | 9/1972 | Brown et al. | 403/408.1 |
| 3,828,515 | 8/1974 | Galgoczy et al. | 29/432 |
| 3,890,697 | 6/1975 | Horioka | 403/408.1 |
| 4,213,620 | 7/1980 | Kennedy et al. | 277/166 |
| 4,249,298 | 2/1981 | Kamamaru et al. | 29/520 |
| 4,573,496 | 3/1986 | Richard | 277/166 |

FOREIGN PATENT DOCUMENTS

| | | | |
|---|---|---|---|
| 4084 | 11/1919 | Netherlands | 403/408.1 |
| 1308916 | 3/1973 | United Kingdom | 403/408.1 |

OTHER PUBLICATIONS

Marks' "Standard Handbook For Mechanical Engineers", 7th Edition, pp. 13-106 Through 13-112.

Primary Examiner—Rodney H. Bonck
Assistant Examiner—David A. Testardi

[57] ABSTRACT

A connection for preventing relative movement between coupled members in a clamped joint. The coupled members are connected across a shear member which transfers shear forces from one member to the other. Each coupled member has a roughened surface with a 500 to 1000 microinch arithmetic average finish providing protrusions which embed into the shear member and allow positive load transfer without slippage. This shear member is made of a material having a lower resistance to plastic deformation than either of the coupled members. Clamping of the joint provides the necessary force for embedding the roughened surface of the coupled members into the shear member. The simplicity and low cost of this connection makes it particularly useful for a wide variety of bolted assemblies.

10 Claims, 4 Drawing Figures

4,688,962

NO-SLIP SHEAR CONNECTION

BACKGROUND OF THE INVENTION

1. Field of the Invention

The present invention relates generally to a connection and method for preventing slippage between load carrying members that are clamped together. More specifically, the invention relates to an insert transferring a relative shear load between mating parts joined in a clamped connection.

2. Description of the Prior Art

There are many assemblies where torque or shear loads are transferred between two members and the members are joined to each other in a clamped or bolted connections. Such assemblies may be dynamic as in drive trains, or static as in frame elements. It is highly desirable that these connections eliminate any relative slippage between the parts under imposed shear or torsional loads.

The prior art has used several methods to eliminate slippage in bolted clamp connections. These methods include providing a sufficient number of bolts between the connection such that friction will transfer torsion or shear loads, providing interlocking mechanical means to transfer loads between the two elements, or applying anaerobic adhesives to increase the shear capacity of the joint and eliminate slippage. Adding additional bolts to the connections increases the cost and assembly time to make the connection. The mechanical interlocking means used in such assemblies includes large diameter dowels, matched assemblies and lapped joints. However, the use of interlocking means decreases the interchangeability of parts and again increases the expense of the connection. In addition, a certain amount of clearance is still associated with dowels and matched assemblies. This clearance allows free motion across the joint prior to engagement of the interlocking components. Anaerobic adhesives represent a relatively new approach to the problem of connection slippage, but suffer the drawbacks of low torsional resistance and high sensitivity to assembly cleanliness.

It is also known to connect two members by deforming a third compliant element disposed between the two members so that the deformed element will engage the two members and transfer loads therebetween. Such a method is shown in U.S. Pat. No, 4,249,298, issued to Kanamaru et al. However, as exemplified by the Kanamaru patent, these methods involve initial large scale deformation of the compliant element across regular machined surfaces. Accordingly, these methods are expensive to employ and suffer the cost disadvantage associated with the interlocking joints previously described.

An objective of this invention is to provide a low cost assembly for positively controlling motion across a clamped connection joining two members.

Another objective of this invention is to provide an insert for a clamp connection capable of carrying a high shear loading and eliminating slippage between two clamped members.

A yet further object of this invention is to provide an inexpensive method for positively joining two mating members in a clamp connection that will prevent free movement between the members.

SUMMARY OF THE INVENTION

These objectives are achieved by the use of a clamp connection for joining two members where opposing faces of the members contact a separate shear member placed between the faces for positively transferring loads and preventing slippage between the two members. The shear member is made of a material having less resistance to plastic deformation than the face portion of either of the two mating members being joined in the connection. The surface of each opposing face is roughened. The shear member is sandwiched between the two mating members as they are clamped together in the connection. Clamping force joining the two parts embeds the roughened surfaces of each member into the shear member thereby providing a positive means of securely and inexpensively transferring shear loads across the two members. Since the surfaces of each joined member are embedded into the shear member, there is no clearance associated with the connection. Before slippage can occur, a shear failure must occur between one side of the shear member and one adjacent face of the joined members. Although the shear member is made of a material having less resistance to plastic deformation than either of the two joined faces, adequate shear capacity of the shear member is provided by adjusting its size.

The use of the shear member to prevent slippage across a clamped joint provide many advantages over the prior art methods. First, the shear member itself is made of relatively inexpensive plate material and the surfaces of the joined members that are in contact with the shear member are easily roughened by knurling, shot blasting or machining. Thus, the connection using the shear member is easier to fabricate and less expensive than joints using a large number of bolts or interlocking elements. Furthermore, the joint using a shear member is relatively insensitive to assembly cleanliness, thereby offering a significant advantage over adhesives. Finally, the shear member joint has a high shear or torsional load capacity which allows it to be used in a wide variety of applications.

Other advantages, variations and embodiments of this invention will become apparent from the following detailed description.

DESCRIPTION OF THE PREFERRED EMBODIMENT

Figure 1:
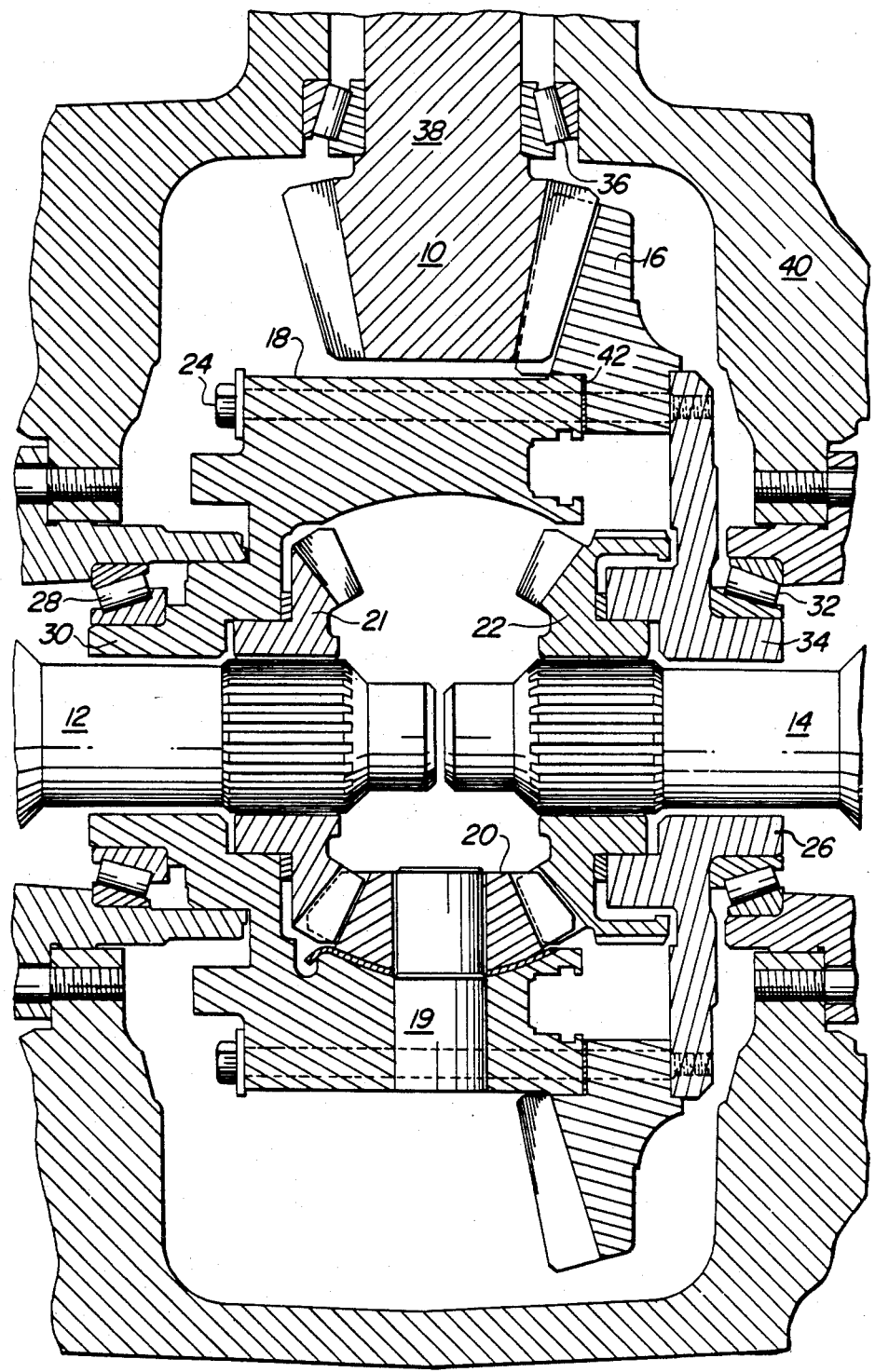
FIG. 1 depicts a section of a differential incorporating the connection of this invention.

FIG. 1 shows the differential portion of a vehicle drive train for transmitting torque from a drive pinion 10 to a pair of output shafts 12 and 14. Torque is transferred from pinion 10 to shafts 12 and 14 by ring gear 16, differential housing 18, a differential pinion 20, rotatably supported by a shaft 19, and a pair of side gears 21 and 22. The connection of this invention is used to attach ring gear 16 to differential housing 18 by inserting a shear member or shear shim 42 between the ring gear and housing. The ring gear is clamped to differential housing 18 by bolts 24 which pass through the differential housing 18, a shear shim 42, and ring gear 16 to engage a differential housing cover 26.

Apart from the addition of shear shim 42, the differential is of a typical construction. Side gears 21 and 22 guide output shafts 12 and 14, respectively, and are, in turn, supported respectively by differential housing 18 and housing cover 26. Drive pinion 10, differential housing 18 and differential housing cover 26 are supported, respectively, by an axle housing 40 through bearing sets 36, 28, and 32, which have their outer races located in axle housing 40. The inner race of bearing set 28 is placed over a sleeve portion 30 of differential housing 18 and the inner race of bearing set 32 is placed over a sleeve portion 34 of differential housing cover 26. Bearing set 36 has its inner race placed over a pinion shaft 28 which is connected to and rotatably supports drive pinion 10.

Figure 2:
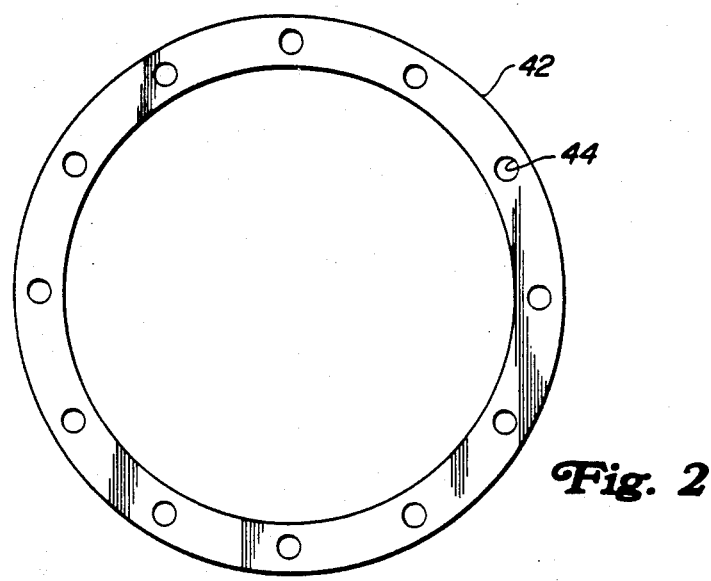
FIG. 2 is a plan view of a shear shim shown in FIG. 1.

Looking then in more detail at the connection between the differential housing and the ring gear, shear shim 42 has been sandwiched between the differential housing and the ring gear in accordance with this invention to prevent slippage between these two elements. Shear shim 42, as shown in FIG. 2, consists of an annular ring having uniformly spaced holes 44 through which bolts 24 pass.

Figure 3:
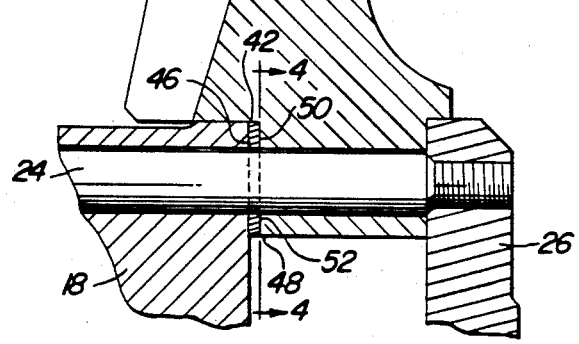
FIG. 3 is an enlarged view of a portion of the connection shown in FIG. 1.

FIG. 3 shows the connection of differential housing 18 and ring gear 16 and the position of shear shim 42 in more detail. As shown in FIG. 3, shear shim 42 is relatively flat with one side 46 positioned against a contact surface 48 located on a flat face of differential housing 18 and an opposite side 50 positioned against a contact surface 52 located on an opposing face of ring gear 16. The portion of contact surfaces 48 and 52 positioned against the shear shim have been knurled either machined, shot blasted or to a 500 to 1000 microinch arithmetic average surface finish.

Figure 4:
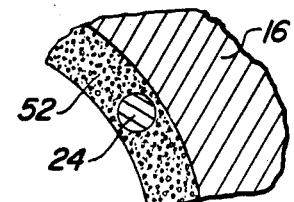
FIG. 4 is a plan view of a portion of a shot blasted surface along line 4—4 in FIG. 3.

FIG. 4 shows a partial plan view of such a shot blasted surface on surface 52. Surface 48 is similar.

The shear shim can be made of any material having a lower resistance to plastic deformation than the material of the ring gear or the differential housing. In this case, ring gear 16 is made of heat treated steel and housing 18 of nodular iron. Thus, the shear shim can consist of a suitable soft metal such as copper or magnesium, or, in this case, aluminum.

ASSEMBLY AND OPERATION

The anti-slip properties associated with the connection of this invention are developed during assembly of the joint. The joint is assembled by placing shear shim 42 between contact surface 48 of the differential housing 18 and contact surface 52 of ring gear 16. Thus, sides 46 and 50 of the shear shim are adjacent to the roughened surfaces of the ring gear and housing. Housing cover 26 is placed to the outside of the ring gear and bolts 24 are passed through differential housing 18, shear shim 42, ring gear 16 and into engagement with housing cover 26. Bolts 24 are then tightened to urge the differential housing, shear shim, ring gear and differential housing cover together. As the shear shim is squeezed between the differential carrier and ring gear, protrusions on the roughened surfaces of the ring gear and differential housing method embed into the softer shim material.

This embodiment mechanically locks the differential housing and the ring gear to the shear shim in a direction transverse to bolts 24. Although localized stresses at the embedment points of the protrusions may be high, overall compressive loading on the shear shim remains low, therefore, large scale compressive relaxation of the shear shim will not occur and the protrusions will remain firmly embedded in the shear shim. In order for slippage to occur across the ring gear and differential housing joint, the shim must fail in the shear. Thus, the minimum embedment area and transverse area of the shear shim are sized to withstand the imposed shear stresses. Due to the relatively large radius of the ring gear and carrier, the shear shim is readily provided with a sufficient transverse area and embedment area to withstand the shear stresses resulting from the applied torsional loads.

The high shear load capacity of the shim will alow torque to be transferred from the ring gear to the differential housing without slippage relative to the housing and gear. In this preferred embodiment, compressive loading across the joint is supplied by engagement of the differential housing cover. Since the differential housing cover serves primarily to close and position the differential housing, no significant torsional loads are transferred betwene the ring gear and the differential cover. As a result, the shear shim is only placed between the ring gear and the differential housing connection.

After a disassembly of the differential in which the ring gear is separated from the housing, the shear shim is discarded. When reassembling the ring gear to the housing, a new shear shim is used so that the contact surfaces of the housing and ring gear are again securely embedded in the shear shim. Due to the simple design and resulting low cost of the shear shim, replacement of the shear shim after each reassembly is only a minor expense.

While this invention has been described in the context of a preferred embodiment, the connection disclosed herein has a wide variety of applications. In particular, this invention may also be useful for bolted connections in vehicle frames where relative sliding between members is highly undesirable. In a typical frame application, a shear member size to withstand relative shear loads can be inserted between members in bolted joints to form a nonslip connection.

Those skilled in the art may also be aware of other assemblies where this invention may be particularly useful. Accordingly, the foregoing description is not meant to limit the scope of this invention or exclude the use of this invention in other applications or assemblies not specifically disclosed herein.

I claim:

1. A clamp connection comprising:
    a first member having a generally flat face, said face being made of a material having resistance to plastic deformation and having a roughened surface with a 500 to 1000 microinch arithmetic average surface finish;
    a second member having a generally flat face parallel to and facing said face of said first member, said face of said second member being made of a material having resistance to plastic deformation and having a roughened surface with a 500 to 1000 microinch arithmetic average surface finish;
    a shear member positioned between the first and second members and having a pair of opposite sides, each side contacting one of said roughened surfaces of said first and second members, said shear member being made of a material having a lower resistance to plastic deformation than the materials of said faces of said first and second members; and means for urging said faces of said first and second members toward each other with sufficient force to embed said roughened surfaces at least partially into said shear member.

2. The connection of claim 1 wherein said urging means comprises at least one bolt clamping said first and second members together.

3. The connection of claim 2 wherein said at least one bolt passes through said at least one shear member.

4. The connection of claim 1 wherein said faces of said first and second members are either machined, shot, blasted, or knurled to provide said roughened surfaces.

5. A bolted clamp connection comprising:
a first member having a generally flat first face, said member being made of a material having a resistance to plastic deformation and said first face having a roughened surface with a 500 to 1000 microinch arithmetic average surface finish;
a second member having a generally flat second face substantially parallel to and facing said first face, said second member being made of a material having a resistance to plastic deformation and said second face having a roughened surface with a 500 to 1000 microinch arithmatic avarage surface finish;
a generally flat shear shim positioned between said first and second members and made of a material having a lower resistance to plastic deformation than the materials of said first and second members; and
a series of bolts for urging said faces of said first and second members together so that said opposing roughened faces of said first and second members embed into opposite sides of said shim to resist relative sliding movement between the first and second members.

6. The connection of claim 5 wherein said bolts pass through said shear plate.

7. A gear connection comprising:
a gear having a relatively flat face perpendicular to its axis of rotation, said face having a roughened surface with a 500 to 1000 microinch arithmetic average surface finish;
a gear retaining member for receiving said gear, said retaining member having a relatively flat face opposite and parallel to said gear face and said member face having a roughened surface with a 500 to 1000 microinch arithmetic average surface finish;
a generally flat shear shim, sandwiched between said gear and retaining member faces, said shim being made of a material having a lower resistance to plastic deformation than the materials of said gear and retaining member, and having said roughened surfaces of said gear and retaining member embedded into opposing flat sides of said shim; and
a series of bolts drawing said gear and retaining member surfaces together about said shim.

8. The connection of claim 7 wherien said gear and retaining member faces are either machined, shot, blasted, or knurled to produce said roughened surfaces.

9. The connection of claim 7 wherein said gear is a ring gear for a differential, said gear retaining member is a differential housing and said shear shim is made of aluminum.

10. A method for transmitting transverse loads across and preventing relative sliding between two clamped together members, said method comprising:
providing a first relatively flat face on a first load carrying member parallel to the direction of the transverse loads;
providing a second relatively flat face parallel to and facing said first face on a second load carrying member;
roughening the surfaces of said first and second faces to a 500 to 1000 microinch arithmetic average surface finish;
sandwiching a relatively flat shear plate between said opposing faces of said members, said plate having a lower resistance to plastic deformation than either of said first and second members and sufficient mechanical strength to transmit said transverse loads; and
clamping said first member to said second member across said plate with sufficient force to plastically deform the surface of said plate in contact with said first and second faces such that said roughened surfaces embed into said plate.

* * * * *

UNITED STATES PATENT AND TRADEMARK OFFICE
CERTIFICATE OF CORRECTION

PATENT NO. : 4,688,962

DATED : 25 August 1987

INVENTOR(S) : Sarkis Aram Koltookian

It is certified that error appears in the above-identified patent and that said Letters Patent is hereby corrected as shown below:

```
Col. 5, line 11, delete "at least one" and
       line 26, change "avarage" to -- average --.
Col. 6, line 15, change "wherien" to -- wherein --.
```

Signed and Sealed this

Fifth Day of April, 1988

Attest:

DONALD J. QUIGG

Attesting Officer

Commissioner of Patents and Trademarks